April 3, 1945.  F. MARTINDELL  2,373,042

FLUID ACTUATED DEVICE

Original Filed Nov. 7, 1942   2 Sheets-Sheet 1

INVENTOR
F. MARTINDELL
BY Harry R. Duft
ATTORNEY

April 3, 1945.　　　F. MARTINDELL　　　2,373,042
FLUID ACTUATED DEVICE
Original Filed Nov. 7, 1942　　2 Sheets-Sheet 2

INVENTOR
F. MARTINDELL
BY Harry L. Duft
ATTORNEY

Patented Apr. 3, 1945

2,373,042

UNITED STATES PATENT OFFICE 2,373,042

FLUID ACTUATED DEVICE

Frank Martindell, Western Springs, Ill., assignor to Western Electric Company, Incorporated, New York, N. Y., a corporation of New York Original application November 7, 1942, Serial No. 464,900. Divided and this application May 8, 1943, Serial No. 486,228

6 Claims. (Cl. 177—311)

This invention relates to fluid actuated devices and particularly to such devices responsive to conditions of fluid flow and is a division of my co-pending application, Serial No. 464,900, filed November 7, 1942.

The invention is particularly applicable, for example, to arc welding operations in a hydrogen atmosphere under a welding hood. In such welding operations, the flow of hydrogen into the hood, at times, may stop, due to either failure of the source of supply or clogging in the conduit connecting the source to the hood. In such cases, it is desirable that a signal be automatically given to the operator.

An object of the invention is to provide a practicable and reliable fluid actuated device responsive to conditions of fluid flow.

In accordance with one embodiment of the invention as applied to arc welding operations under a reciprocatory hood in a hydrogen atmosphere, there is provided a device operating from the pressure differential, effected by conditions of flow between a hydrogen supply conduit connected thereto, which includes a capillary tube or other suitable member having a restricted orifice and a connected restricted outlet conduit communicating with the welding hood and means actuated by the device, which is responsive to a normal flow of the hydrogen as well as a stoppage of flow thereof either at the inlet or restricted outlet sides of the device, due to either failure of the supply source or clogging of the outlet, or within the capillary tube, to give a signal to the operator.

Figure 1:
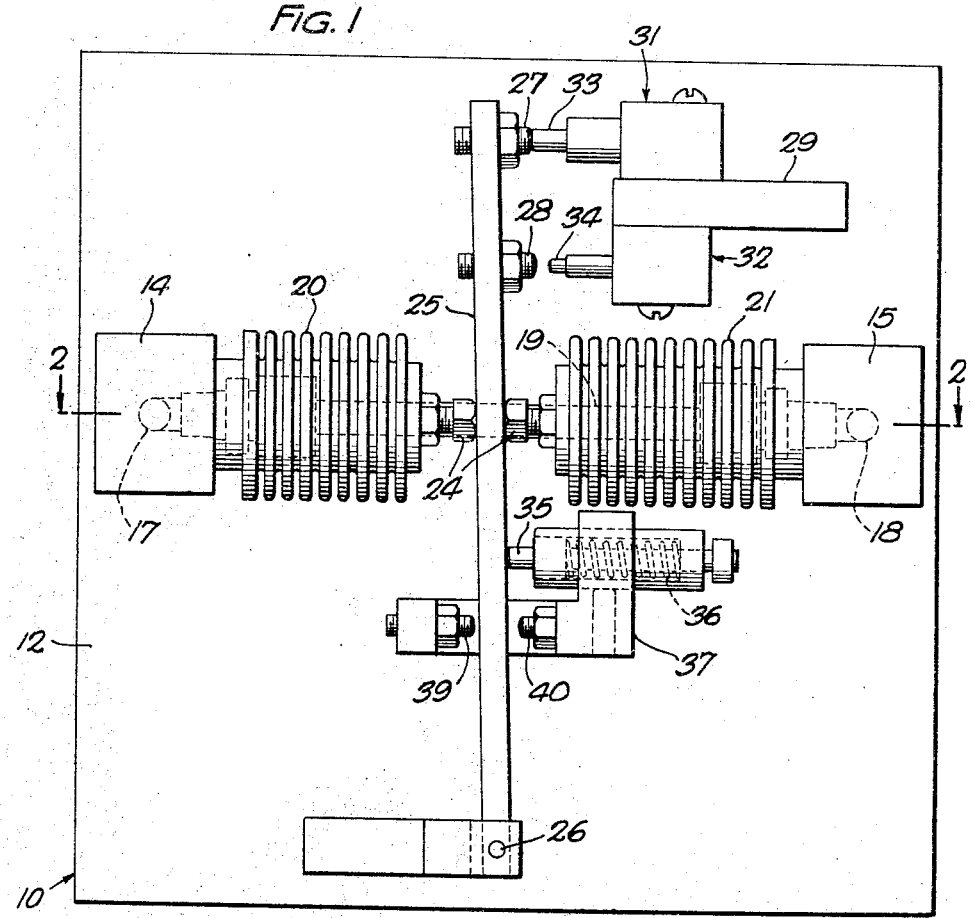
Figure 2:
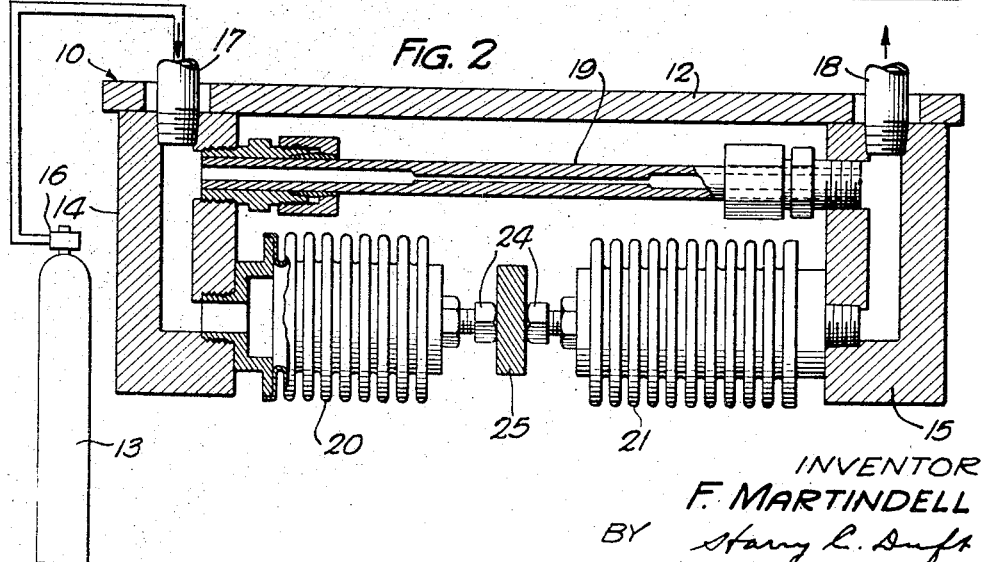
Figure 3:
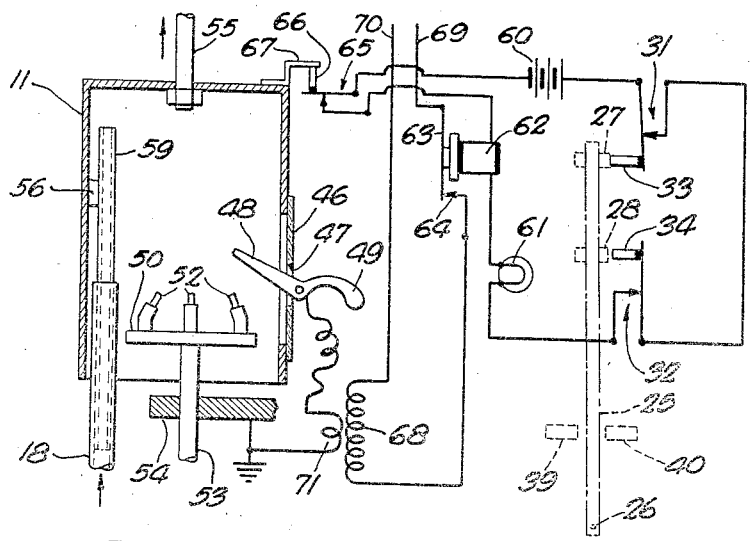
Figure 4:
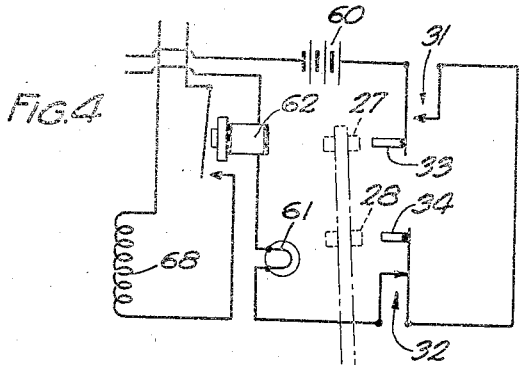
Figure 5:
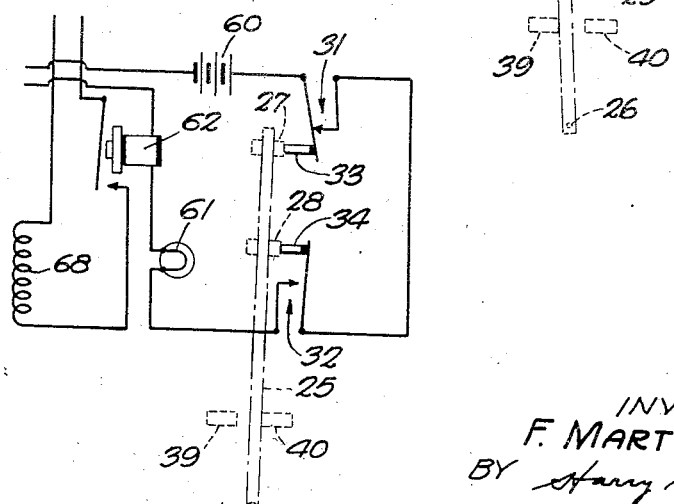

Other objects and advantages of this invention will more clearly appear from the following detailed description, taken in connection with the accompanying drawings, in which Fig. 1 is a front elevation of a hydrogen flow actuated device, embodying the features of the invention shown, connected to a hydrogen supply conduit for supplying a hood of an arc welding apparatus with hydrogen;

Fig. 2 is a plan section, partly in elevation, taken on the line 2—2 of Fig. 1;

Fig. 3 is a diagrammatic view of portions of the combined hydrogen flow indicator and electric circuit controlling device for indicating hydrogen flow conditions from the supply source through the device and into the hood and for preventing completion of the welding circuit until the hydrogen has flowed into the hood for a predetermined time, the circuit being shown operated in response to a normal hydrogen flow condition; and Figs. 4 and 5 are fragmentary views of Fig. 3 showing the device and circuit operated in response to a stoppage of hydrogen flow to the hood and a clogging in the capillary tube, respectively.

Referring to the drawings in detail and particularly to Figs. 1 and 2, a fluid actuated device responsive to conditions of fluid flow, indicated, in general, at 10 (Fig. 1) is provided for use in connection with arc welding performed under a hydrogen atmosphere, or other inert gaseous mediums, in a bell or hood indicated at 11 (Fig. 3). The device 10 comprises a base 12, which is attached to a standard or frame (not shown) and fixed to the base are two spaced and aligned cored members 14 and 15, to which are connected hydrogen inlet and outlet conduits 17 and 18, respectively, the member 14 providing an inlet chamber and the member 15 an outlet chamber. The inlet conduit 17 is connected to a suitable constant supply source, shown schematically at 13 (Fig. 2), for hydrogen under, for example, approximately four pounds pressure, a pressure regulating valve being indicated at 16. The outlet conduit 18 is of such length or cross-section that it provides a restricted outlet from the device to produce a back pressure in the outlet chamber, the hydrogen passing through the device into the hood 11, where it flows thereinto under a very slight pressure. The cored members 14 and 15 are in communication with each other by means of an interconnecting capillary tube 19 or other suitable member having a restricted orifice. Rigidly supported on and in communication with the interior of the cored member 14 is a bellows 20, which is responsive to four pounds pressure per square inch, and similarly supported and in communication with the interior of the cored member 15 is a bellows 21, which is responsive to one pound per square inch of pressure, the two bellows being in axial alignment. The opposed free inner sealed ends of the bellows 20 and 21 each carry an adjustable headed screw 24, which constantly engage opposite sides of a vertical arm 25 pivoted at its lower end at 26 to the base 12. Adjustably mounted in the upper end of the pivotal arm 25 are adjustable switch actuating screws 27 and 28. Attached to the base 12 above the capillary tube 19 and bellows 20 and 21 is a bracket 29, upon opposite sides of which are secured normally open and closed micro-switches 31 and 32 of a standard commercial type having operating plungers 33 and 34, respectively, the switch actuating screws 27 and 28 being aligned with the plungers.

The arm 25 is maintained in a normal initial position when no hydrogen is flowing through the device through the action of a spring pressed plunger 35 constantly engaging the arm, the plunger being carried by an adjustable housing 36 carried on a bracket 37 fixed to the base 12. Adjustably carried by the bracket 37, below the plunger 35, are two adjustable stop screws 39 and 40, one at each side of the pivotal arm 25, for limiting its movement in either direction about its pivot 26. In the normal initial position of the arm 25, it engages the stop screw 39, at which time the switches 31 and 32 are in their normal open and closed positions, respectively.

In the use of the fluid actuated device 10, above described, the compressed hydrogen flows into the device through the inlet conduit 17 and thence through the member or chamber 14, capillary tube 19, member or chamber 15 and restricted outlet conduit 18 to the interior of the welding bell or hood 11 (Fig. 3). The inlet and outlet pressures in the chambers 14 and 15 and capillary tube 19 are also impressed upon the bellows 20 and 21, respectively. The device 10 operates on the pressure differential between the inlet and outlet ends of the capillary tube 19 and when the normal desired flow of hydrogen through the device and into the bell or hood 11 is being maintained, the arm 25, receiving motion from the pressure responsive bellows 20, will move clockwise about its pivot 26 (Fig. 1) against the action of the spring-pressed plunger 35 and assumes such a position that the switch actuating screw 27, carried by the arm 25, will operate the normally open switch 31 through its operating plunger 33 to its closed position, as shown in Fig. 1 and in diagrammatic view Fig. 3, such position of the arm 25 not affecting the normally closed switch 32. The operation of the combined indicating and safety control circuit (Figs. 3, 4 and 5), which includes the switches 31 and 32, will be described presently.

In the case of complete stoppage of the hydrogen flow through the restricted outlet conduit 18 of the device 10, following the capillary tube 19, due to clogging therein or a failure of the supply source, the pressures in both of the bellows 20 and 21 will be equalized, thus permitting the arm 25 to move counterclockwise, through the action of the spring-pressed plunger 35, and assume such a position that it will engage the stop screw 39. In response to this latter movement of the arm 25, the switch 31 is permitted to return to its normally open position. If the device 10 should become clogged in the capillary tube 19, the pressure on the bellows 20 will be so great that the arm 25 will be moved clockwise against the action of the spring-pressed plunger 35 sufficiently not only to close the normally open switch 31, but to open the normally closed switch 32, which condition is illustrated diagrammatically in Fig. 5, this latter movement of the arm 25 being limited by its engagement with the stop screw 40.

Referring to the diagrammatic views, Figs. 3, 4 and 5, and particularly to Fig. 3, wherein is illustrated the hood or bell 11 in which arc welding is performed in a hydrogen atmosphere, the hood 11 is provided with a window 46 of suitable transparent material and has an opening 47 whereby an operator may insert and manually manipulate an electrode 48 having a handle 49. Disposed below the electrode 48 in the hood 11 is an electrode 50, which is shown in the form of a turntable upon which a plurality of work piece assemblages 52 to be arc welded are suitably held. A depending shaft 53 attached to the electrode turntable 50 is journalled in a supporting frame 54 of the welding apparatus. Attached to the closed upper end wall of the hood 11 is a shaft 55, which is reciprocated by suitable means (not shown) for the purpose of elevating and lowering the hood 11. After each welding operation, the turntable electrode 50 is rotated, by suitable actuating means (not shown) connected to the shaft 53, to position another assemblage of work pieces 52 in position for welding. After the plurality of assemblages of work pieces 52 carried on the turntable electrode 50 are welded, the hood 11 is elevated sufficiently to permit the removal of the welded work pieces 52 and to reload the turntable. Thereafter, the hood 11 is lowered and the welding operations are repeated. The purpose of providing a turntable electrode 50 and supporting a plurality of work piece assemblages thereon is to perform the welding operation in a hydrogen atmosphere in an economical and practical manner. In order to economize in the use of the hydrogen which is constantly flowing into the hood 11, it is desirable that the operations of raising and lowering the hood be held to a minimum since each time the table is raised, hydrogen is wasted and further each time the hood is raised and lowered, it is necessary that the hydrogen should flow thereinto for a predetermined time in order to fill it and remove the air therefrom in order that the welding operations may safely follow. To further this economy in the use of the hydrogen, which is constantly flowing during normal operations into the hood 11 by means of the conduit 18 connected to the chamber 15 at the outlet end of the hydrogen flow actuated device 10, the following arrangement is provided. The hood 11 has attached to its inner wall, as indicated at 58, a conduit 59, which is telescopically entered in the bore of the conduit 18. The upper end of the conduit 59 is open, or it may be closed, and its wall apertured to permit the flow of hydrogen therefrom into the hood. Thus, in any position of the hood 11, the hydrogen will flow thereinto at a fixed plane adjacent its upper closed end.

The combined indicating and safety control circuit (Fig. 3) which includes the micro-switches 31 and 32, connected in series in the circuit, also includes a battery 60, or other source of electric energy, an electric lamp 61, or other signal device, and a retarded relay 62, which, upon energization, is slow to operate its armature 63, which is shown as engaging a circuit closing contact 64, all suitably connected in the circuit. Also included in this circuit is a third normally open micro-switch 65, similar to the switch 31, having an operating plunger 66 lying in the path of a switch actuating member 67 carried by the reciprocatory hood 11, the member 67 closing the switch 65 in the final period of movement of the hood to its lowered position. In Fig. 3, the combined indicating and control circuit have been completed by the closing of the normally open micro-switches 31 and 65, in the manner hereinbefore described, it being assumed that a normal flow of hydrogen is passing through the device 10 and the conduit 18 into the welding hood 11. Thus, the lamp 61 is lighted, indicating the hydrogen flow is normal, and the armature 63 of the retarded relay 62 has been operated upon lapse of a predetermined period of time sufficient to insure that the welding hood 11 is filled with hydrogen and void of air. As shown, the operated relay armature 63 has engaged the contact 64 and thus has closed the primary of the welding circuit, indicated at 68, which is supplied from a suitable electric energy source connected to main conductors 69 and 70. The welding circuit through a secondary 71 of the welding circuit, which includes the electrodes 48 and 49, is thus completed and the operator may manipulate the electrode 48 to weld the assemblages of piece parts 52 in the manner previously described.

Although a specific embodiment of the invention has been described hereinbefore as applied to an arc welding apparatus, wherein hydrogen is used, it is clear that it may have a more general application and other inert gaseous mediums may be used and that modifications can be made.

What is claimed is:

1. In a fluid actuated indicator device responsive to conditions of constant fluid flow between a fluid supply source and the point of use of the fluid, a pair of fluid pressure actuated bellows, a member having a constant restricted orifice communicating at opposite ends with said bellows, fluid inlet and restricted outlet conduits communicating with said bellows and member, an arm actuated by differential pressure on said bellows, and means responsive to predetermined movements of said arm for indicating fluid flow conditions at said outlet conduit.

2. In a fluid actuated indicator device responsive to conditions of constant fluid flow between a fluid supply source and the point of use of the fluid, a pair of fluid pressure actuated bellows, an inlet chamber connected to one of said bellows, an outlet chamber connected to the other of said bellows, a capillary tube having a constant orifice connected at opposite ends with said inlet and outlet chambers, a fluid inlet conduit connected to said inlet chamber, a restricted outlet conduit connected to said outlet chamber, and an arm operatively associated with both of said bellows for actuation by differential pressure on said bellows for indicating fluid flow conditions at said outlet conduit.

3. In a fluid actuated indicator device responsive to conditions of constant fluid flow between a fluid supply source and the point of use of the fluid, a pair of fluid pressure actuated bellows, a capillary tube having a constant orifice having one end connected to one of said bellows and its opposite end connected to the other of said bellows, a fluid inlet conduit communicating with one end of said tube and to its connected bellows, a restricted outlet conduit communicating with the opposite end of said tube and to its connected bellows, and an arm actuated by differential pressure on said bellows for indicating fluid flow conditions at said outlet conduit.

4. In a fluid flow indicator device, a source of constant fluid pressure to provide a fluid flow, a pivotal lever, means including a pair of opposed expansible bellows connected to said source each supported at one end and at their free opposite ends being operatively engaged with said lever for moving the same, a member having a constant restricted orifice communicating at opposite ends with said bellows at their supported ends, and fluid inlet and restricted outlet conduits in communication with the opposite ends of said member, the movements of said lever being in response to variation of the pressure between said bellows and the resultant positions of the lever being effective to indicate fluid flow conditions at said outlet conduit.

5. In a fluid flow indicator device, a base, a lever pivoted thereon, a source of constant fluid pressure to provide a fluid flow, means including a pair of opposed differentially expansible bellows connected to said source each supported at one end on said base and at their free opposite ends operatively engaged with said lever for moving the same in response to differential and equalized pressure between said bellows, a member having a constant restricted orifice communicating at opposite ends with said bellows, fluid inlet and restricted outlet conduits connected to opposite ends of said member, and means responsive to predetermined movements of said lever for indicating fluid flow conditions at said outlet conduit.

6. The combination with an apparatus which includes a hood containing an inert gaseous medium, a source of constant gaseous medium pressure to provide a gaseous medium flow, of a gaseous medium flow indicator device communicating with the hood, said device comprising a pair of fluid pressure actuated bellows connected to said source, a capillary tube having a constant orifice communicating at opposite ends with said bellows, fluid inlet and restricted outlet conduits communicating with said bellows and capillary tube, said restricted outlet conduit communicating with the interior of the hood, an arm actuated by differential pressure on said bellows, and means responsive to predetermined movements of said arm for indicating gaseous medium flow conditions at the interior of the hood.

FRANK MARTINDELL.